Oct. 10, 1939.  S. GUARNASCHELLI  2,175,662
SUPPORT FOR FLEXIBLE HOSE
Filed March 24, 1938  2 Sheets-Sheet 2
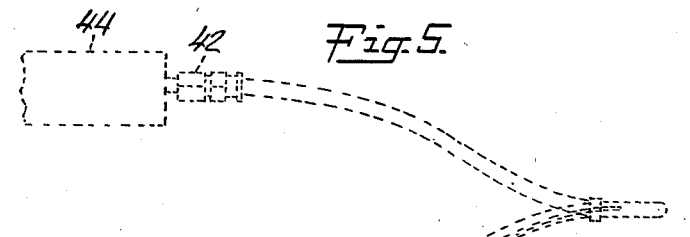
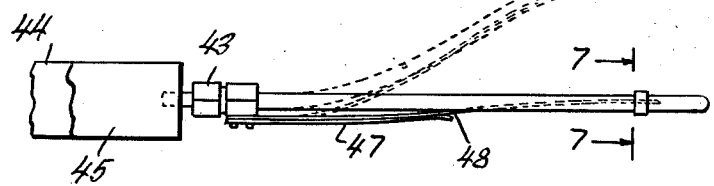
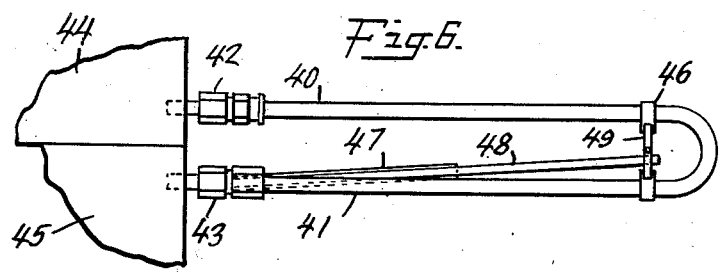
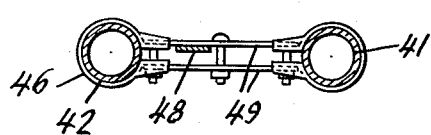
INVENTOR
Stephen Guarnaschelli
BY
Marshall + Hawley.
ATTORNEYS Patented Oct. 10, 1939

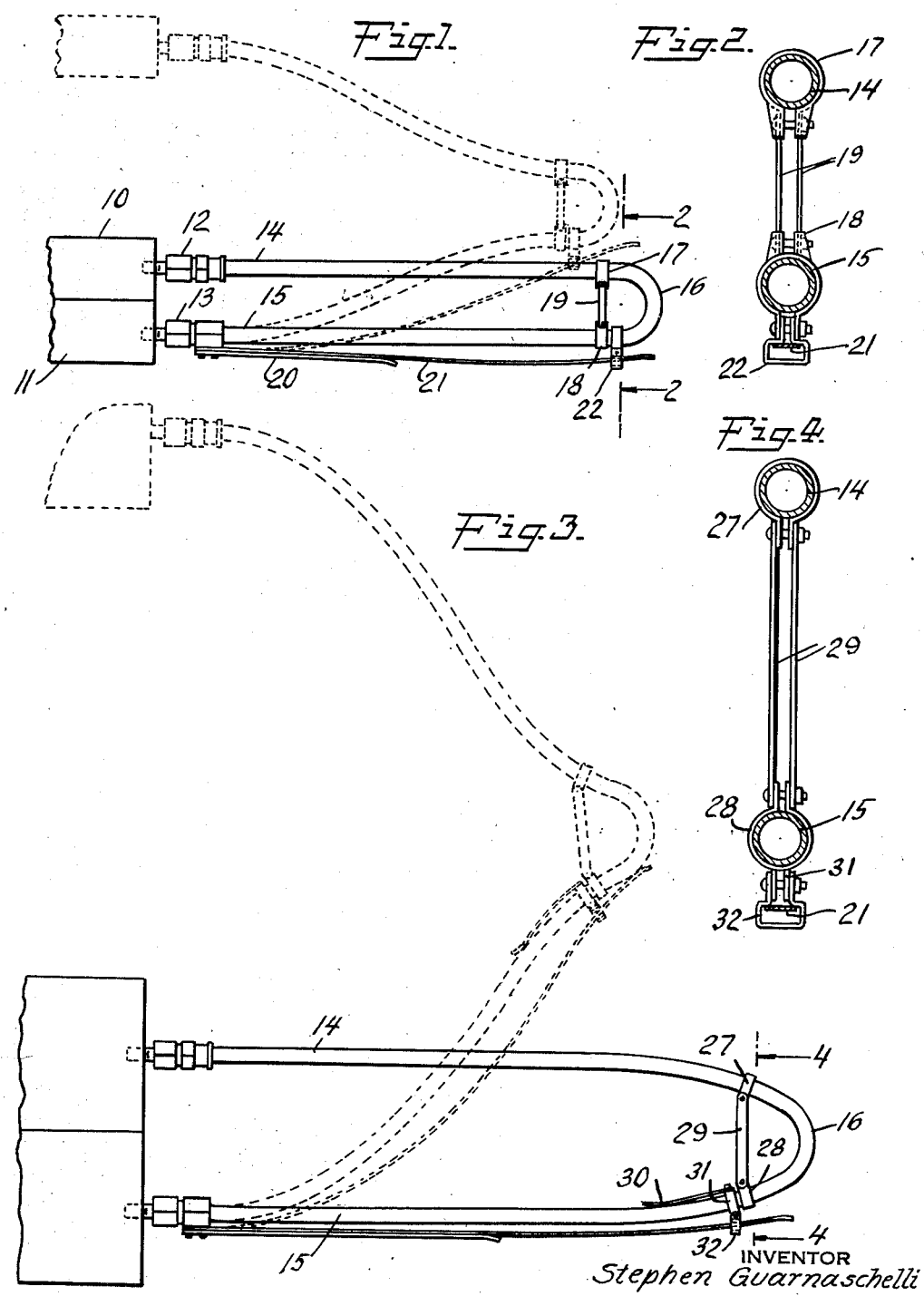

2,175,662

UNITED STATES PATENT OFFICE 2,175,662

SUPPORT FOR FLEXIBLE HOSE

Stephen Guarnaschelli, Elmhurst, N. Y., assignor to Packless Metal Products Corporation, New York, N. Y., a corporation of Delaware Application March 24, 1938, Serial No. 197,768

3 Claims. (Cl. 138—61)

This invention relates to supports for flexible hose.

Flexible metallic hose is used in platen presses as a conduit between the platens to conduct steam and water from one platen to the other. As the press is opened and the platens move apart, it is essential that the hose be supported in order to eliminate strains or pockets and to insure free positive drainage. Moreover, it is essential that strain on the couplings be eliminated to prevent wear and leakage.

This invention has for its salient object to provide a simple and practical support for flexible hose conduits particularly designed for platen presses and so constructed and arranged as to support the hose in all positions, prevent slack or pockets therein and relieve strain on the hose couplings.

Another object of the invention is to provide a support of the character described so constructed and arranged as to insure free positive drainage.

Further objects of the invention will appear from the following specification taken in connection with the drawings which form a part of this application, and in which Fig. 1 is an elevational view showing a hose support constructed in accordance with the invention, the hose being shown in full lines in the position taken when the platens are disposed in closed position and being shown in dotted lines in the position taken when the platens are separated to their maximum open position;

Fig. 2 is a transverse sectional elevation on an enlarged scale, taken substantially on line 2—2 of Fig. 1;

Fig. 3 is a view similar to Fig. 1 but illustrating a slightly modified form of construction which permits a wider separation of the platens;

Fig. 4 is a transverse sectional elevation on an enlarged scale, taken substantially on line 4—4 of Fig. 3;

Fig. 5 is a view similar to Fig. 1 but showing a form of construction used when the press platens are disposed side by side in closed position, the hose and support being shown in full lines in the position taken when the press is closed and in dotted lines in the position taken when the press is open to its maximum opening;

Fig. 6 is a top plan view of the construction shown in Fig. 5; and

Fig. 7 is a transverse sectional elevation on an enlarged scale, taken substantially on line 7—7 of Fig. 5.

The invention briefly described consists of a support for a U-shaped flexible hose or conduit having its ends connected to the platens of a platen press and movable vertically with relation to each other, the support comprising a clamp bridging the bight portion of the conduit or hose, fittings secured to the ends of the hose and a spring strip fixed to one leg of the hose at the fixed end of the hose and slidably engaging said leg at a point spaced from the fixed end and arranged to support the hose in all positions thereof and to take the weight of the hose off of the fittings.

Further details of the invention will appear from the following description.

In the embodiment of the invention illustrated in Figs. 1 and 2, there is illustrated a pair of press platens 10 and 11, to which are secured fittings or couplings 12 and 13 which are carried by and secured to the ends 14 and 15 of a U-shaped flexible hose or conduit having a bight portion 16 connecting the legs. The legs of the hose adjacent the bight portion are connected by clamping means comprising clamps 17 and 18 and strips or bars 19 which connect the clamps together.

The hose supporting and guiding means consists of a fixed support or platform member comprising a bar 20 fixedly secured to the fitting 13 and a metallic spring strip 21 also fixed at one end of the fitting 13 and having its other end disposed in a loop or eye 22 secured to the outer end of the leg 15 adjacent the bight and clamp 18.

The spring 21 is so tensioned that it will support the weight of the hose in any position and will thus take the weight off the fittings and prevent wear and leakage. Furthermore, the spring 21 guides the hose in its vertical movements and confines the vertical movements to a single plane.

The construction shown in Figs. 3 and 4 is substantially the same as that shown in Figs. 1 and 2 and differs therefrom only in the clamp which bridges the bight 16.

In this form of the invention the clamps 27 and 28 which are connected to the two legs of the hose are connected together by strips or bars 29 which are angularly disposed relative to the clamps, thus permitting a wider normal maximum opening of the hose.

Furthermore, a strip 30 is secured to the clamp 31 to which the eye 32 is connected, the strip 30 engaging the upper surface of the outer end portion of the leg 15 of the hose and guiding this portion as the press is opened and closed.

The form of the invention illustrated in Figs. 5, 6 and 7 was developed for a minimum or zero opening when the press is closed. In this form of the invention, as shown particularly in Fig. 6, the two legs of the hose are disposed side by side in a horizontal plane when the press is closed and as the platens move apart the bight or outer end of the hose is still maintained in horizontal position.

In this form of the invention the two ends 40 and 41 of the legs of the hose are secured in the fittings 42 and 43 which in turn are secured to the press platens 44 and 45. The clamp 46 which bridges the bight portion of the hose is the same as that shown in Figs. 1 and 2.

In this form of the invention the stationary support or platform 47 is secured to the fitting 43 on the underside thereof and the spring strip 48 is also secured between the platform and the fitting, but the outer end of the spring strip in this case extends between the connecting bars or strips, 49, 49 which form a part of the clamp 46.

As the press is opened the leg 40 which is secured to the platen 44, is raised, the parts taking the position shown in dotted lines in Fig. 5.

From the foregoing description it will be seen that the hose supporting and guiding means supports the hose in all positions of movement thereof thereby preventing slack or pockets and also preventing the hose from sagging, thereby causing the fittings to wear and leak.

Although certain specific embodiments of the invention have been particularly shown and described it will be understood that the invention is capable of modification and that changes in the construction and in the arrangement of the various cooperating parts may be made without departing from the spirit or scope of the invention, as expressed in the following claims.

What I claim is:

1. A support for substantially supporting the weight of a U-shaped flexible conduit having its ends connected to a pair of members relatively movable vertically with relation to each other, comprising a clamp bridging the bight portion of the conduit, fittings secured to the ends of the hose, a flat, spring metal strip fixed at one end relative to the lower member and, at its free end, slidably supporting the conduit at a point spaced from the lower member whereby an upward lift is exerted on the flexible conduit, and means fixed relative to the lower member, disposed below said strip and limiting the downward movement of said strip.

2. A support for substantially supporting the weight of a U-shaped flexible conduit having its ends connected to a pair of members relatively movable vertically with relation to each other, comprising means for holding the bight portion of the conduit against flexing, fittings secured to the ends of the hose and a flat, spring metal strip fixed relative to the lower member at one end and exerting an upward lift on the conduit and slidably supporting the conduit at a point spaced from the lower member.

3. A support for substantially supporting the weight of a U-shaped flexible conduit having its ends connected to a pair of members relatively movable vertically with relation to each other, comprising means for holding the bight portion of the conduit against flexing, fittings secured to the ends of the hose, a flat, spring metal strip fixed at one end relative to the lower member and slidably supporting the conduit at a point spaced from the lower member, and a member secured to and extending below the lower leg of the conduit and slidably engaged by said spring strip whereby the conduit is supported.

STEPHEN GUARNASCHELLI.